United States Patent
Nozue et al.

(10) Patent No.: US 9,044,831 B2
(45) Date of Patent: Jun. 2, 2015

(54) METHOD OF JOINING PART HAVING HIGH FATIGUE STRENGTH

(75) Inventors: Akira Nozue, Tokyo (JP); Osamu Kimpara, Aichi (JP)

(73) Assignee: OHASHI TECHNICA, INC., Tokyo (JP)

(*) Notice: Subject to any disclaimer, the term of this patent is extended or adjusted under 35 U.S.C. 154(b) by 238 days.

(21) Appl. No.: 13/816,053

(22) PCT Filed: Jun. 29, 2011

(86) PCT No.: PCT/JP2011/064869
§ 371 (c)(1), (2), (4) Date: Feb. 8, 2013

(87) PCT Pub. No.: WO2012/026205
PCT Pub. Date: Mar. 1, 2012

(65) Prior Publication Data
US 2013/0133785 A1    May 30, 2013

(30) Foreign Application Priority Data
Aug. 24, 2010   (JP) .................. 2010-187094

(51) Int. Cl.
| | |
|---|---|
| B23K 31/00 | (2006.01) |
| B23K 20/02 | (2006.01) |
| B23K 11/00 | (2006.01) |
| B23K 20/00 | (2006.01) |
| B23P 11/02 | (2006.01) |

(52) U.S. Cl.
CPC .............. B23K 31/00 (2013.01); B23K 20/021 (2013.01); B23K 20/028 (2013.01); B23K 2201/006 (2013.01); B23P 11/02 (2013.01); B23K 20/008 (2013.01); B23K 11/002 (2013.01)

(58) Field of Classification Search
USPC .......................... 148/526; 219/117.1
See application file for complete search history.

(56) References Cited

U.S. PATENT DOCUMENTS
2009/0110575 A1   4/2009  Munakata et al.

FOREIGN PATENT DOCUMENTS
| | | |
|---|---|---|
| JP | 7-001150 A | 1/1995 |
| JP | 8-174234 A | 7/1996 |

(Continued)

OTHER PUBLICATIONS
International Search Report for PCT/JP2011/064869, mailing date of Sep. 27, 2011.

*Primary Examiner* — Rebecca Lee
(74) *Attorney, Agent, or Firm* — Westerman, Hattori, Daniels & Adrian, LLP

(57) ABSTRACT

A method of joining using a supporting electrode 4 having a cooling circuit and a pressure electrode 8 movably arranged above the supporting electrode, using a steel material causing martensitic transformation for one of or both of a first member 20 having an opening portion and a second member 24, engaging the second member with the opening portion of the first member, starting conduction from a power supply to the supporting electrode and the pressure electrode, allowing an insertion portion of the second member to enter the opening portion of the first member by a pressure force of the pressure electrode, causing the second member and an inner wall portion of the opening portion to be subjected to solid-phase diffusion joining, rapidly cooling the both members by thermal conduction of the supporting electrode after the joining, and quenching a joined portion and generating compressive residual stress by the rapid cooling.

7 Claims, 10 Drawing Sheets

(56) References Cited

FOREIGN PATENT DOCUMENTS

| | | |
|---|---|---|
| JP | 2001-353628 A | 12/2001 |
| JP | 2004-114146 A | 4/2004 |
| JP | 2004-195520 A | 7/2004 |
| JP | 2005-186093 A | 7/2005 |
| JP | 2006-289527 A | 10/2006 |
| JP | 2007-170672 A | 7/2007 |
| JP | 2007-260721 A | 10/2007 |
| JP | 2009-108784 A | 5/2009 |
| WO | 2006/033316 A1 | 3/2006 |

METHOD OF JOINING PART HAVING HIGH FATIGUE STRENGTH

TECHNICAL FIELD

The present invention relates to a method of joining a part concerning an element part made of metal and having high fatigue strength.

BACKGROUND ART

In a typical welding method, many objects tend to expand when heat is applied to a welded portion and the like. In this manner, the heat serves a similar function to an external force that deforms an object. Here, when an object is uniformly heated, the object freely expands and is isotropically deformed. However, in a case where only a portion to be welded is locally heated like welding, the expansion is obstructed by surrounding materials, and this causes thermal stress in the object and brings about residual stress.

Usually, only the vicinity of a welded portion is heated/cooled in a steel welded portion. However, thermal deformation of expansion/constriction caused thereby is restricted by a surrounding base material, and yield stress of a steel material decreases with temperature, and plastic deformation of compression is caused to the material in the middle of heating.

Only the welded portion (in a case of a rod model) becomes short after being cooled due to a plastic strain of the compression. However, because the welded portion and the base material have been joined, the welded portion is stretched by the surrounding base material. As a result of that, tensile residual stress is caused in the vicinity of the steel welded portion.

Patent Literature 1 discloses a joining method using resistance welding regarding high pressure hydraulic piping and a joining method thereof, and Patent Literature 2 discloses that projection welding is used for a welded structure of a shaft member and a plate member.

FIG. 11 is a residual stress distribution diagram of typical fused joining. In this fused joining, distribution of tensile residual stress can be observed over a large area around a joined portion. Such tensile residual stress in the joined portion has a major defect of reducing the fatigue strength although depending on the extent.

Further, because the welded portion may have various defects including a texture defect such as a blowhole and a shape defect such as a notch, it is indispensable to conduct a qualification test such as X-ray inspection and ultrasonic testing for important welded parts.

Under such circumstances, it is necessary to design a product in consideration of a large safety factor for an important product, or to design a product not to include a welded portion. In any case, it is the fact that, in manufacturing machine products and automobile parts, great attention has been given to the welded portion therein not only to the product design but also to quality assurance in a manufacturing department.

Also, conventionally, quenching heats a metal material to high temperature, and rapidly cools the material in water or in oil. In a case of steel, the steel is heated to be an austenite structure and is then rapidly cooled, thereby being changed into a martensitic structure, and being extremely hardened.

To obtain the martensitic structure by quenching the steel, it is necessary to have a carbon equivalent above a certain level, and to cool the steel at a critical cooling rate or more.

As a method of enhancing the fatigue strength of a steel product, a method of thermal treatment such as carburization quenching, high-frequency quenching, and a soft-nitriding method has been known in which martensitic transformation is caused on a surface and compressive residual stress is generated on the surface. However, such heat treatment cannot be used for a welded part. This is because a weld defect may be included in a welded portion. Therefore, there is a concern that hardening of the surface of the welded portion may further cause a decrease in reliability of the welded portion. Therefore, in a case where parts that include a welded portion are subjected to a carburization process, it is typical to perform anti-carburization before the carburization process in order to prevent the welded portion from being carburized.

Here, the applicant of the present patent application previously disclosed a press-fit joining method in Patent Literature 3. In this method, a shaft member is solid-phase joined with a plate member (an opening portion is drilled) by means of press-fit joining using a jig such as an electrode.

CITATION LIST

Patent Literature

Patent Literature 1: JP 7-1150 A
Patent Literature 2: JP 8-174234 A
Patent Literature 3: JP 2004-114146 A

SUMMARY OF INVENTION

Technical Problem

However, in the typical welding method illustrated in FIG. 11, when a member that is equivalent to the welded portion is heated to a given temperature and is cooled, compressive stress and a plastic strain are caused during the heating process and are changed into tensile stress during the cooling process, and finally tensile residual stress is caused.

Therefore, when the member that is equivalent to the welded portion is heated to a given temperature and is cooled, the compressive stress and the plastic strain is caused during the heating process and is changed into the tensile stress during the cooling process, and finally the tensile residual stress is caused. Therefore, in a welded joined part, the fatigue strength is lowered compared with an integral product.

Also, in the conventional quenching, it is necessary to heat a material into high temperature and to rapidly cool it in water or in oil. Further, it is necessary to use a heating apparatus such as a furnace in order to configure these processes. It is also necessary to control temperatures at the time of high temperature and at the time of cooling. Therefore, there is a problem of requiring a lot of work.

Also, so called regular thermal treatment has technical difficulty in quenching and hardening an inner portion of a steel material.

A cooling method in high-frequency quenching typically cools the steel material with a spray of water. This high-frequency quenching has a characteristic of quenching a specific position in an accurate and reasonable manner because surface effect of high-frequency current is used. However, there is restriction of a part that is limited to a part using a steel material having a carbon content of 0.25% or more.

The present invention has been made in view of the foregoing problems, and an object of the present invention is to provide a method of joining a part having a highly reliable joined portion, excellent fatigue strength, and excellent economical efficiency.

Solution to Problem

In order to solve the above problems, as illustrated in FIGS. 1 and 2, there is provided a method of joining a part having high fatigue strength for joining a first member 20 having an opening portion 22 formed in a vertical direction and a second member 24 having an insertion portion with a constant cross section according to the present invention including: providing a press-fit interference to the insertion portion of the second member corresponding to the opening portion of the first member; using a supporting electrode 4 having a cooling circuit 34 formed inside, and a pressure electrode 8 movably arranged above the supporting electrode; using a steel material causing martensitic transformation for one of or both of the first member and the second member; supplying a coolant to the cooling circuit; placing the first member on an upper surface portion of the supporting electrode and causing the pressure electrode to hold the second member; causing the pressure electrode to descend with a pressure force and engaging the second member with the opening portion of the first member; starting conduction from a power supply to the supporting electrode and the pressure electrode, rapidly heating a joined portion between the both members by resistance heat due to the conduction and softening the joined portion, causing the insertion portion of the second member to enter the opening portion of the first member by the pressure force of the pressure electrode, and causing the second member and an inner wall surface portion of the opening portion to be subjected to solid-phase diffusion joining; rapidly cooling the both members by thermal conduction of the supporting electrode after completion of the joining; and quenching the joined portion and generating compressive residual stress by the rapid cooling.

Here, the solid-phase diffusion joining represents diffusion joining of a solid-phase state.

The progress of press fit by softening stops automatically due to a sharp decrease in electrical resistance heat generation due to a sharp decrease in the electrical resistance. The conduction is then cut off after the stop of the press fit. In this case, it is desirable to cut off the conduction right after the stop of the press fit. Accordingly, cooling by an electrode can be expeditiously performed and sufficient quenching effect of the joined portion can be obtained. Also, necessary compressive residual stress can be obtained and excellent joining strength can be obtained.

There is provided the method of joining a part having high fatigue strength according to the present invention, wherein a steel material having a carbon equivalent of 0.15% or more is used for one of or both of the first member 20 and the second member 24.

There is provided the method of joining a part having high fatigue strength according to the present invention, wherein a steel material subjected to a carburization process or a steel material subjected to a soft-nitriding process is used for one of or both of the first member 20 and the second member 24.

As illustrated in FIG. 5, there is provided a method of joining a part having high fatigue strength for joining a first member 20 having an opening portion 22 formed in a vertical direction and a second member 24 having an insertion portion with a constant cross section according to the present invention including: providing a press-fit interference to the insertion portion of the second member corresponding to the opening portion of the first member; using a supporting electrode 4 having a cooling circuit formed inside, and a pressure electrode 8 movably arranged above the supporting electrode; using a steel material for both of the first member and the second member; supplying a coolant to the cooling circuit; adjusting the opening portion of the first member with a hole portion of a heat radiation electrode portion bulged out in a form of a ring on a part of an upper surface portion of the supporting electrode and placing the first member on an upper surface contact portion 37 of the heat radiation electrode portion 36, and causing the pressure electrode to hold the second member; causing the pressure electrode to descend with a pressure force and engaging the second member with the opening portion of the first member; starting conduction from a power supply to the supporting electrode and the pressure electrode, rapidly heating a joined portion between the both members by resistance heat due to the conduction and softening the joined portion, causing the insertion portion of the second member to enter the opening portion of the first member by the pressure force of the pressure electrode, and causing the second member and an inner wall surface portion of the opening portion to be subjected to solid-phase diffusion joining; rapidly cooling the joined portion being in contact with the heat radiation electrode portion by thermal conduction after completion of the joining; and generating compressive residual stress to the joined portion by the rapid cooling of the joined portion.

There is provided the method of joining a part having high fatigue strength according to the present invention, wherein a contact width of the upper surface contact portion 37 of the heat radiation electrode portion 36 is 3 mm or more.

There is provided the method of joining a part having high fatigue strength according to the present invention, wherein the contact width of the upper surface contact portion 37 is five times or less a press-fit depth of the insertion portion of the second member 24 to enter the opening portion 22 of the first member 20.

Advantageous Effects of Invention

According to a method of joining a part having high fatigue strength of the present invention, a configuration is employed, in which a steel material that causes martensitic transformation is used for one of or both of a first member and a second member, a supporting electrode having a cooling circuit formed inside and a pressure electrode are used, the first member and the second member are subjected to solid-phase diffusion joining, the both members are rapidly cooled by thermal conduction of the supporting electrode after the joining, and quenching is performed to the joined portion. Therefore, compressive residual stress is caused in the joined portion of the first member and the second member, and a joined part having high fatigue strength can be obtained. Additionally, the joined portion has high reliability, and the joined part can be expeditiously and efficiently obtained. Therefore, effect of excellent economical efficiency can also be obtained.

According to a method of joining a part having high fatigue strength of the present invention, a configuration is employed, in which a steel material is used for both of a first member and a second member, a supporting electrode having a cooling circuit formed inside and a pressure electrode are used, the first member is placed on an upper surface contact portion of a heat radiation electrode portion bulged out in a form of a ring on a part of an upper surface portion of the supporting electrode, and the pressure electrode is caused to hold the second member, the first member and the second member are subjected to solid-phase diffusion joining, and a joined portion being in contact with the heat radiation electrode portion is rapidly cooled by thermal conduction. Therefore, compressive residual stress is caused in the joined portion of the first member and the second member, and a joined part having high fatigue strength can be obtained. Further, even if a steel material that rarely causes a martensitic structure is used, excellent effect such that the compressive residual stress is caused can be obtained. Additionally, the joined portion has high reliability, and the joined part can be expeditiously and efficiently obtained. There is effect of excellent economical efficiency.

DESCRIPTION OF EMBODIMENTS

Hereinafter, embodiments according to the present invention will be described with reference to the drawings.

First, a joining method according to a first embodiment will be described.

Figure 1:
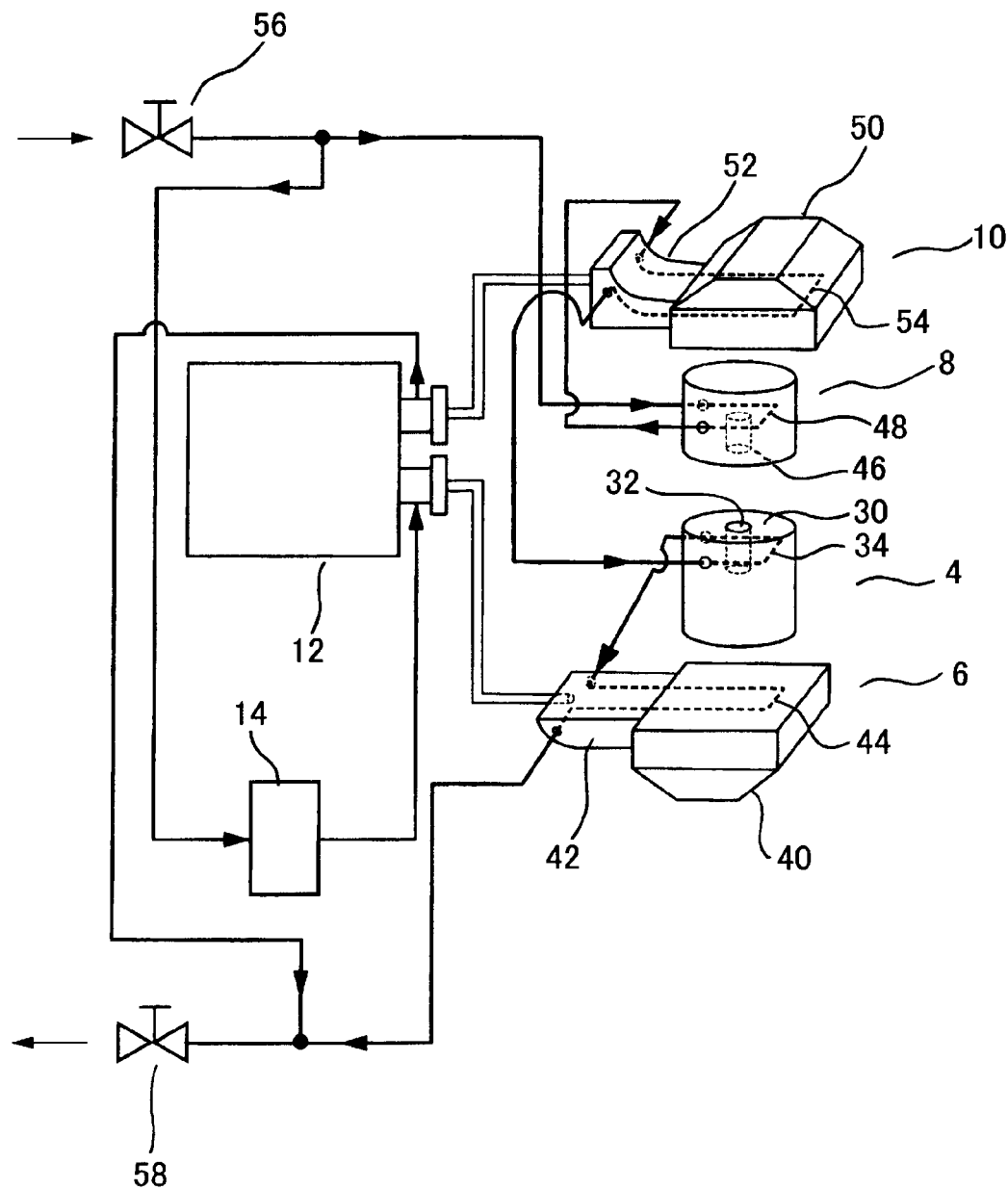
FIG. 1 is a cooling system diagram of an electrode mechanism in a joining device according to a first embodiment of the present invention.

FIG. 1 illustrates a cooling system diagram of an electrode mechanism of a joining device for performing a method of joining a part having high fatigue strength according to an embodiment.

This electrode mechanism includes a supporting electrode 4, a lower platen 6 that holds the supporting electrode 4, a pressure electrode 8, an upper platen 10 that holds the pressure electrode 8, a power transformer 12 (TR) for power supply, a thyristor 14 (SCR) that controls cut-off of power supply to the electrode, and the like. Further, the above-described joining device includes a positioning mechanism, a pressure mechanism (not illustrated), and the like.

Figure 2:
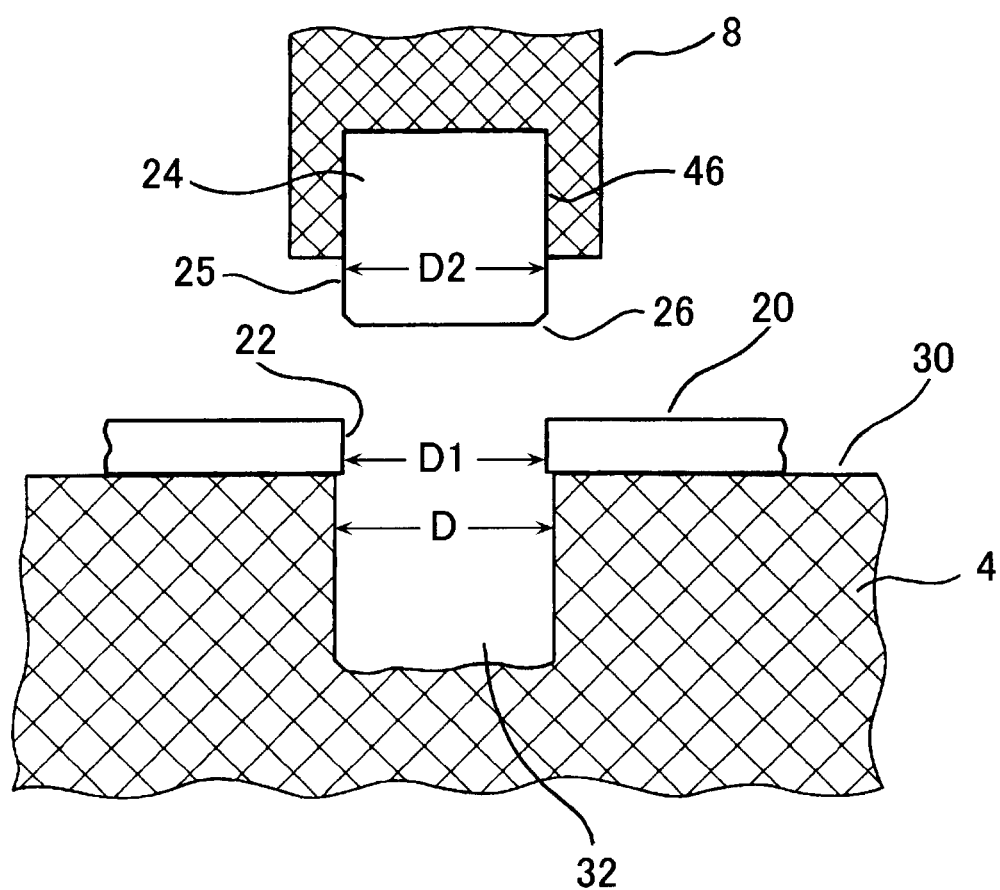
FIG. 2 is a diagram illustrating a state in which a work piece is held by an electrode according to the first embodiment.

As illustrated in FIG. 2, a part to be joined by the joining device is formed of an element part made of metal, and includes a plate member 20 provided with an opening portion 22 and a shaft member 24 joined to the opening portion 22 of the plate member.

Both of the supporting electrode 4 and the pressure electrode 8 are made of chromium copper, and both of the lower platen 6 and the upper platen 10 are made of brass.

The supporting electrode 4 has a circular hole portion 32 (or a through opening portion) formed into a columnar shape with a predetermined depth in a center of an upper surface portion 30. This hole portion 32 is provided to form a relief because a periphery of the opening portion 22 of the plate member 20 is deformed in a press-fit direction when the shaft member 24 is press-fit joined to the plate member 20 as a work piece.

The size of the hole of the hole portion 32 (D: diameter) is formed slightly larger than that of the shaft member 24. This is because the shaft member 24 is kept from coming in contact with the hole portion 32 of the supporting electrode 4. Also, it is desirable that the size of the hole of the hole portion 32 (D: diameter) be slightly larger than the inner diameter of the opening portion 22 of the plate member 20.

Also, a cooling circuit 34 through which a coolant passes is formed inside the supporting electrode 4. This cooling circuit 34 is formed into a U shape in a state of surrounding the hole portion 32 when the supporting electrode 4 is viewed from above, and is horizontally formed nearer an upper position between an upper end and a lower end of the supporting electrode 4.

The lower platen 6 includes a holding unit 40 that places and holds the supporting electrode 4 on an upper surface portion, and a conduction unit 42 extended from the holding unit 40. This conduction unit 42 is electrically connected with an output terminal of the power transformer 12. Also, a lower surface portion of the holding unit 40 is placed on and fixed to a supporting portion of the joining device.

Further, a cooling circuit 44 through which a coolant passes is formed inside the lower platen 6. The cooling circuit 44 runs from the conduction unit 42 to holding unit 40, and is formed into a shape going around the holding unit 40 in a U-shaped manner and going back to the conduction unit 42. The lower platen 6 also contributes to cooling of the supporting electrode 4.

The pressure electrode 8 has a columnar shape, and a circular holding hole portion 46 is formed with a predetermined depth in a center of a lower surface portion.

Also, a cooling circuit 48 through which a coolant passes is formed inside the pressure electrode 8. This cooling circuit 48 is formed into a U shape in a state of surrounding the holding hole portion 46 when the pressure electrode 8 is viewed from above, and is horizontally formed in a center portion between an upper end and a lower end of the pressure electrode 8.

The holding hole portion 46 of the pressure electrode 8 holds the shaft member 24 as a work piece. There is another configuration for the pressure electrode, which is formed of a holding electrode unit divided into two or a plurality of electrode pieces that grasp the shaft member and a pressure electrode unit that pressures the shaft member.

The upper platen 10 includes a pressure holding unit 50 that attaches the pressure electrode 8 to a lower surface portion, and a conduction unit 52 extended from the pressure holding unit 50. This conduction unit 52 is electrically connected to an output terminal of the power transformer 12.

Also, a cooling circuit 54 through which a coolant passes is formed inside the upper platen 10. This cooling circuit 54 runs from the conduction unit 52 to the pressure holding unit 50, and is formed into a shape going around the pressure holding unit 50 in a U-shaped manner and going back to the conduction unit 52. The upper platen 10 also contributes to cooling of the pressure electrode 8.

Further, an upper surface portion of the pressure holding unit 50 is fixed to an actuator unit of a press mechanism (a hydraulic type and the like) of the joining device. This actuator unit causes the pressure holding unit 50 to move upward/ downward according to an instruction from a control unit, and allows the pressure holding unit 50 to descend with a given pressure force.

By the way, each of the cooling circuits has an inlet of a coolant at one end portion and an outlet of a coolant at the other end portion. The cooling circuits are coupled in series, and a coolant passing through a water supply valve 56 from a water supply apparatus sequentially passes and cools the cooling circuit 48 of the pressure electrode 8, the cooling circuit 54 of the upper platen 10, the cooling circuit 34 of the supporting electrode 4, and the cooling circuit 44 of the lower platen 6, and passes through a drain valve 58 and is drained. Also, each part of the power transformer 12 and the thyristor 14 is cooled by the coolant passing through cooling circuits formed inside.

By cooling the supporting electrode 4 and the pressure electrode 8, the work piece (the plate member 20 and the shaft member 24) is cooled in conjunction with prevention of overheating of the electrode itself. Further, by cooling the lower platen 6 and the upper platen 10, cooling of each of the supporting electrode 4 and the pressure electrode 8 is facilitated, and overheating of each platen itself is prevented.

The power supply used for the conduction can employ a direct current and the like that use a direct-current, an alternating-current, or a high-capacity capacitor. Also, adjustment of a pressure force of the press mechanism, starting/stopping control of conduction (by the thyristor 14) with respect to the supporting electrode 4 and the pressure electrode 8 from the power transformer 12, and adjustment of a flow rate of the coolant of the cooling circuit and opening/closing control of the cooling circuit can be performed according to control from a control unit (not illustrated).

The plate member 20 has a predetermined thickness, and the opening portion 22 provided in the plate member 20 has a circular shape with a cross section having a constant diameter, and an inner wall surface portion of the opening portion 22 is formed from a plate surface of the plate member 20 in a vertical direction.

Here, the plate thickness of the plate member 20 is 3.2 mm, and the inner diameter of the opening portion 22 is 11.7 mm.

It is appropriate that the plate thickness of the plate member 20 is 1 mm or more, and the upper limit of the plate thickness depends on the inner diameter of the opening portion 22 (the diameter of the shaft member 24), the capacity of the power transformer 12, and the like.

The shaft member 24 has a columnar shape (or a cylindrical shape) with a constant cross section, and has a flat upper surface portion and lower surface portion. Also, a corner portion of a periphery of the lower surface portion of the shaft member 24 is removed, and a chamfered portion 26 is formed.

Here, the shaft member 24 has the outer diameter of 12.0 mm. It is appropriate that the outer diameter of the shaft member 24 is equivalent to or more than double the plate thickness of the plate member 20.

The outer diameter (diameter) of an insertion portion 25 of the shaft member 24 is slightly larger than the inner diameter of the opening portion 22 of the plate member 20, and a press-fit interference is a difference therebetween. This press-fit interference allows an outer periphery portion of the insertion portion 25 of the shaft member 24 to contact with and to rub on an inner wall surface portion of the opening portion 22 of the plate member 20 to form a joined interface, so that press-fit joining throughout the complete periphery is performed.

Further, one of or both of an upper edge portion of the opening portion 22 of the plate member 20 and an edge portion of the lower surface portion of the shaft member 24 are subjected to a chamfering process.

As conditions of press fit, a predetermined press-fit interference (d) and a press-fit depth (h) are set. This press-fit interference (d) is regarding the diameter, and here, d=the outer diameter (D2) of the shaft member 24—the inner diameter (D1) of the opening portion 22 of the plate member 20. Also, the press-fit depth (h) is h=a press-fit (entry) depth of the insertion portion of the shaft member 24.

In this embodiment, the press-fit interference (d) is 0.3 mm (12.0−11.7 mm). The press-fit interference can be in any range as long as press fit is possible. The press-fit interference of the range of 0.1 to 0.7 mm is practical, and the range of 0.1 to 0.5 mm is satisfactory since fewer burrs occur.

Also, the press-fit depth (or the plate thickness of the plate member) of the range of 1 to 6 mm is practical and satisfactory, and the inner diameter of the opening portion 22 (approximately the outer diameter of the shaft member 24) of the range of 4 to 50 mm is favorable in terms of the capacity of the power supply and the like.

Further, as a work piece, a member having the opening portion 22 drilled in the vertical direction (various shapes such as a cube) can be used in place of the plate member 20. Further, the shaft member 24 can have an insertion portion made of a shaft material having a polygonal columnar shape, a columnar shape obtained by cutting off a side surface of a column (the cross section is a semicircle and the like), a tooth-shaped periphery (cross section), or the like. The shaft member favorably has a flat upper surface portion and lower surface portion. However, the lower surface portion of the shaft member may have a curved surface shape according to the surface shape of a portion to be joined of the plate member, and any shape other than the flat surface may be employed as long as the upper surface portion is capable of performing conduction.

The shaft member 24 (the insertion portion) takes a form in which the complete periphery is joined when the shaft member 24 has a cross section that is a similar figure to the opening portion 22. However, a shaft member not having a similar figure can be employed. In any case, the press-fit interference is necessary between the opening portion 22 and the shaft member (the complete periphery or a part thereof).

Here, an internal test regarding the embodiment was performed using steel materials for the plate member 20 and the shaft member 24, which has various carbon equivalents described below, and using a carburized material obtained by carburizing a steel material as a part of the material. Results thereof will be compared and analyzed.

In this test, as the plate member 20 and the shaft member 24, the following steel materials having the carbon equivalents and the carburized material are used.

As first materials, three kinds of materials having the carbon equivalent of 0.06%, the carbon equivalent of 0.20%, and the carbon equivalent of 0.35% are used for both of the plate member and the shaft member.

As second materials, a material having the carbon equivalent of 0.06% is used for the plate member 20, and a material having the carbon equivalent of 0.35% is used for the shaft member 24.

As third materials, a material having the carbon equivalent of 0.06% is used for the plate member 20, and the carburized material is used for the shaft member 24.

Note that the joining method in any of the cases using any of the above-described materials is the same.

Here, a process regarding the above-described joining method will be described.

In a joining process, joining conditions are set in advance for a joining device (control unit). The joining conditions include a pressure force, a pressure time, a current value, a conduction time, a conduction pattern of electricity, and the like.

In this embodiment, the pressure force is 4000 N. A pressure force which does not cause press fit when pressure is applied before conduction is a maximum pressure force, and a pressure force which does not cause spark discharge due to a short right after the start of the conduction is a minimum pressure force. Therefore, 60 to 90% of the above-described maximum pressure force is appropriate for an optimal pressure force.

Also, the conduction current is 17 kA, and the conduction time is 0.25 seconds. An optimal value of the conduction time is determined according to the joining conditions and the like. The conduction time is normally set to be one second or less, and a range of 0.1 to 0.5 seconds is most suitable for this. Also, the conduction current is desirably 5 kA or more.

Further, before the start of the joining process, a water supply valve 56 and a drain valve 58 are opened based on an instruction from the control unit, and supply of a coolant to be sent to each cooling circuit from the water supply apparatus is started. The pressure electrode 8, the upper platen 10, the supporting electrode 4, and the lower platen 6 are cooled by the coolant distributed in each cooling circuit.

Then, as illustrated in FIG. 2, as a work clamp process, the electrodes hold the plate member 20 and the shaft member 24, respectively. The plate member 20 is placed on the upper surface portion 30 of the supporting electrode 4. At this time, the plate member 20 is positioned and arranged in such a way that a center of the opening portion 22 of the plate member 20 is located on a center of the hole portion 32 of the supporting electrode 4. At this time, a positioning member and the like may be used to allow the plate member 20 to be fit in a predetermined position.

Further, the shaft member 24 is held by the pressure electrode 8. This shaft member 24 is inserted into the holding hole portion 46 of the pressure electrode 8, and is physically grasped and held by the holding hole portion 46. In this way, the shaft member 24 is grasped by the holding hole portion 46, whereby an influence of electrical resistance of the shaft member 24 itself can be reduced.

Next, the process moves on to a pressuring process by a press mechanism. The pressure force by the press mechanism is always held constant. With the press mechanism, the shaft member 24 is moved to a predetermined positioning position by the upper platen 10 while being held by the pressure electrode 8. Then, the press mechanism presses the upper platen 10 to cause the shaft member 24 held by the pressure electrode 8 to descend with the pressure force, so that the shaft member 24 is eventually engaged with the opening portion 22 of the plate member 20.

In this way, the shaft member 24 is engaged with an upper portion of the opening portion 22 of the plate member 20, and the both sides are adjusted with a time lag of about one second. At this time, the shaft member 24 and the opening portion 22 of the plate member 20 are accurately adjusted by the chamfered portion 26 of the shaft member 24.

Also, the shaft member 24 is maintained with a given pressure force with respect to the opening portion 22 of the plate member 20 by the press mechanism.

Then, the thyristor 14 operates (supplies power) and conduction between the pressure electrode 8 and the supporting electrode 4 via the upper platen 10 and the lower platen 6 is started according to an instruction from the control unit.

Figure 3:
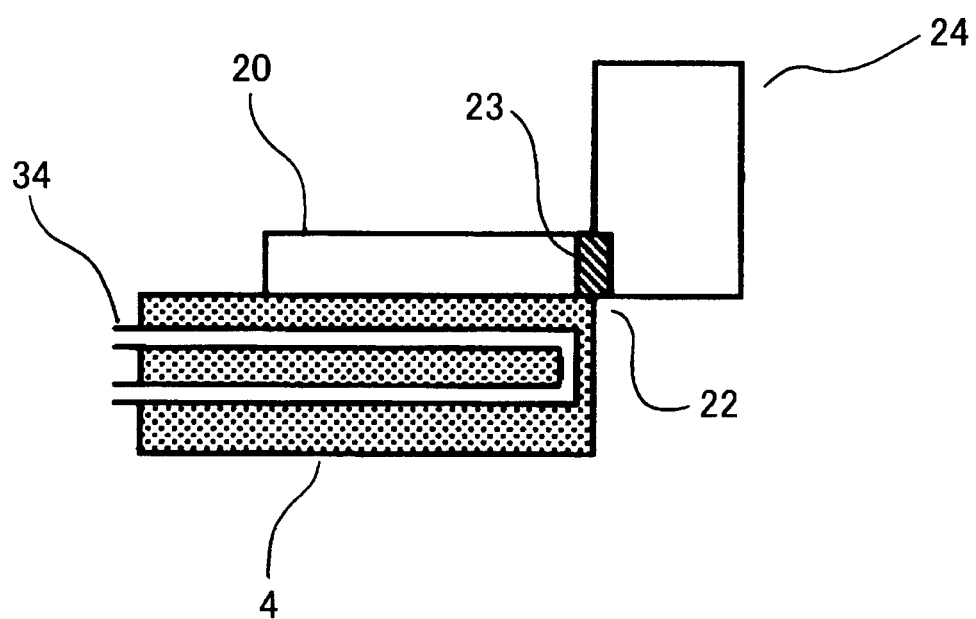
FIG. 3 is a diagram illustrating a joined state according to the first embodiment.

Accordingly, as illustrated in FIG. 3, a large amount of electric current in a joined portion 23 of the shaft member 24 and the opening portion 22 of the plate member 20, the joined portion 23 is softened as occurrence of electrical resistance heat generation and press fit of the shaft member 24 is started, and the insertion portion 25 of the shaft member 24 descends in the opening portion 22 of the plate member 20.

In this case, the shaft member 24 is press fit into the opening portion 22 of the plate member 20, and at this time, a rubbing action is caused to the joined interface of the both members, whereby the press-fit joining is performed. The wall surfaces of the plate member 20 and the shaft member 24 are rubbed to each other as these surfaces move in a sliding direction, so that an impurity layer of the surfaces are smoothed and the surfaces are cleaned, and diffusion joining of a solid-phase state (solid-phase diffusion joining) is performed with respect to the cleaned structure of the joined interface.

In the above-described joining method, the press-fit joining is performed with a given pressure force as described above, and the joined portion is instantly heated and a tip portion of the shaft member 24 is press fit into the opening portion 22 of the plate member 20 in a short time, so that the joining is completed.

After a predetermined time elapses from the start of the conduction, the conduction is stopped according to an instruction from the control unit. The conduction time from the start to the stop of the conduction is set slightly longer than the time from the start to the completion of the press-fit joining of the shaft member with respect to the hole portion of the plate member (note that 0.2 seconds or less is favorable). Here, the conduction time is 0.25 seconds.

Further, in this case, because of a sharp increase of the joined portion 23 caused by the progress of the press fit (a given pressure force), and a sharp decrease in electrical resistance heat generation due to a sharp decrease in the electrical resistance of the joined portion 23 associated therewith, a softening phenomenon of the joined portion 23 stops simultaneously, and the progress of the press fit stops automatically. From the start to the stop of the press fit (progress) is normally 0.5 seconds or less.

Following that, the conduction between the pressure electrode 8 and the supporting electrode 4 is stopped according to an instruction from the control unit. In this case, it is desirable to immediately cut off the conduction after the stop of the press fit. Accordingly, the cooling by the electrode can be expeditiously performed, sufficient quenching effect to the joined portion can be obtained, necessary compressive residual stress can be obtained, and excellent joining strength can be obtained.

Right after the press fit, the temperature of the joined portion 23 of the opening portion 22 of the plate member 20 and the shaft member 24 as a work piece is high. Meanwhile, the supporting electrode 4 is always cooled by the cooling circuit 34. Therefore, the work piece and the joined portion 23 of the plate member and the shaft member are rapidly cooled by the supporting electrode 4.

Also, in conjunction with that, cooling of the joined portion 23 is performed by the cooled pressure electrode 8 via the shaft member 24. Further, the supporting electrode 4 is cooled by the cooled lower platen 6, and the pressure electrode 8 is also cooled by the upper platen 110, whereby effective cooling is performed.

As a cooling period of the work piece after the stop of the conduction, 0.5 to 2 seconds is secured. With this cooling, quenching of the joined portion 23 is performed. Note that the quenching is performed with the depth of 0.2 mm or more (confirmed with a photograph of a cross section).

As described above, since the joining method employs a process of localized electrical resistance heat generation and conduction by a water cooling electrode in an extremely short time, a heated portion is an extremely narrow area in the vicinity of the joined portion 23, and heat at the time of joining is not transferred to an area close to the joined portion 23 at the time of cooling. Therefore, this contributes to the cooling of the joined portion 23 as a coolant. Therefore, the cooling is performed by double cooling effect: the cooling by the cooled supporting electrode 4 and the like (thermal conduction) and the cooling action via the material (normal temperature) in the vicinity of the joined portion 23 (thermal conduction).

The joined portion 23 of the work piece flows large current in a short time and is rapidly heated to get softened and joined. Meanwhile, after the stop of the conduction, since the joined portion 23 is rapidly cooled by the electrode cooled by the cooling circuit. Therefore, in a case of a steel material having the carbon equivalent of 0.15% or more as described below, martensitic transformation is caused in the vicinity of the joined interface of the joined portion 23.

After the joining, the pressure by the pressure mechanism is unloaded, and the work piece (the joined part by the plate member and the shaft member) is taken out of each of the electrodes.

Note that, in the case of the above-described joining method, a significant change of the structure like typical fused joining is not caused in the vicinity of the joined portion. Therefore, an area of the joined portion cannot be clearly specified. Therefore, the joined portion is treated as follows from an area where a change in distribution of the residual stress can be observed.

In a case of a material that causes the martensitic transformation, the area of the joined portion is an area where the martensitic transformation remains around the joined interface. In a case of a material that does not cause the martensitic transformation, because distribution of a hardness by the joining gradually decreases as being away from the joined interface (approximately maximum), the area of the joined portion is an area of an average hardness, that is, an area of a portion having a hardness that is ½ of the maximum hardness around the joined interface.

FIGS. 4(a), 4(b), and 4(c) relate to joined parts (the shaft member is joined to the plate member) using the above-described materials as a work piece, and illustrate results of measuring the residual stress of the joined portions according to the embodiment.

Here, FIG. 4(a) relates to joined parts using the first materials, FIG. 4(b) relates to a joined part using the second materials, and FIG. 4(c) relates to a joined part using the third materials.

Figure 4:
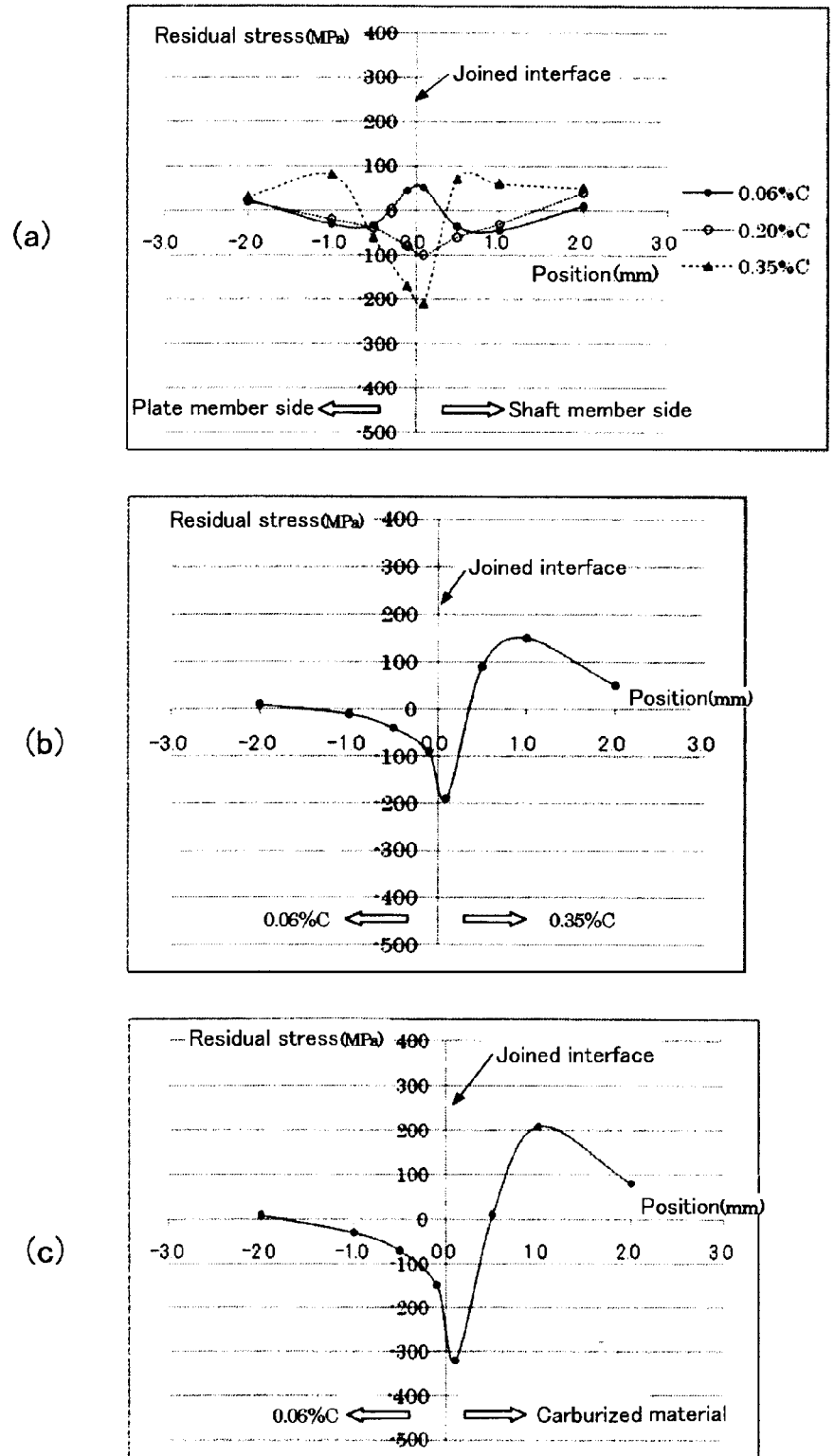
FIGS. 4(a), 4(b), and 4(c) are diagrams illustrating measurement results of residual stress of a joined portion according to the first embodiment (a micro-area X-ray stress measurement apparatus manufactured by Rigaku Corporation is used for measurement).

Also, FIG. 4 illustrates residual stress distribution of the joined portions, the horizontal axis represents a joined position (mm), "0.0" shows a center position of the joining, a right side of 0.0 shows the shaft member 24, and a left side of 0.0 shows the plate member 20. Also, the vertical axis represents residual stress (MPa), and a plus side of the center position "0" shows occurrence of the residual stress of tensile (tensile residual stress) and a minus side shows occurrence of the residual stress of compression (compressive residual stress), respectively.

First, according to measurement results of the joined parts using the first materials in FIG. 4(a), in a case where the carbon equivalent of the plate member and the shaft member as a work piece is 0.06%, the residual stress occurring in a part of the joined portion 23 (plus 0.3 mm and minus 0.3 mm from the position "0") is slightly at the tensile residual stress (distributed at the plus side).

Meanwhile, in a case where the carbon equivalent of the work piece is 0.20%, the residual stress occurring in the vicinity of the joined portion 23 is distributed at the compressive residual stress side (at the minus side). Also, in a case where the carbon equivalent is 0.35%, the residual stress occurring in the vicinity of the joined portion 23 is distributed at the compressive residual stress side (at the minus side) in a large way.

From these results, it can be considered that, if the carbon equivalent of the work piece is 0.20% or more, the martensitic transformation is caused to the steel material (the joined portion 23), and sufficient compressive residual stress was obtained accordingly. Also, in the case where the carbon equivalent is 0.06%, the tensile residual stress occurs. From this fact, it can be presumed that the martensitic transformation is caused to the steel material (the joined portion 23) if the carbon equivalent is about 0.15% or more, and it can be considered that the compressive residual stress is caused in the vicinity of the joined portion 23.

It is widely known that a member having the compressive residual stress has high fatigue strength.

The present embodiment uses the steel material having the carbon equivalent of 0.15% or more, and employs extremely short time heating and localized electrical resistance heating in an extremely narrow area. Therefore, a heated portion is an extremely narrow area in the vicinity of the joined portion. Further, a process having double cooling effect, namely, the cooling of a portion close to the joined portion and the cooling by the water cooling electrode, is employed at the time of cooling. Therefore, quenching effect equivalent to or greater than high-frequency quenching can be obtained.

Next, according to a measurement result of the joined part using the second materials in FIG. 4(b), the residual stress occurring in the vicinity of the joined portion 23 is distributed at the compressive residual stress side (at the minus side). Therefore, even if the carbon equivalent of the plate member 20 is 0.06%, if the carbon equivalent of the shaft member 24 is 0.35%, the residual stress occurring in the vicinity of the joined portion 23 is changed to the compressive residual stress side such that it is influenced by the characteristic of the carbon equivalent of the shaft member 24 (the carbon equivalent of 0.35% in FIG. 4(a)).

From this fact, it can be considered that, if one of the carbon equivalents of the plate member and the shaft member is about 0.15% or more, the compressive residual stress occurs in the vicinity of the joined portion 23.

Also, according to a measurement result of the joined part using the third materials in FIG. 4(c), the residual stress occurring in the vicinity of the joined portion 23 is distributed at the compressive residual stress side (at the minus side). Therefore, even if the carbon equivalent of the plate member 20 is 0.06%, the residual stress occurring in the vicinity of the joined portion 23 is distributed at the compressive residual stress side when the carburized material is used for the shaft member 24.

From this fact, it can be considered that, in a case where the carburized material is used for one of the plate member and the shaft member, the compressive residual stress occurs in the vicinity of the joined portion 23.

When the applicant measured the residual stress of the joined parts by the internal test, which were obtained by the joining method using the various joining materials, a result was obtained such that a joined part that used a steel material having higher carbon equivalent has a joined portion having higher compressive residual stress. This is a completely different (opposite) result from the result of residual stress (tensile residual stress) in a joined portion by typical welding (described in the above background art), and this is characteristic effect of the joining method according to the present embodiment.

To prevent occurrence of the tensile residual stress and to create a joined part having high fatigue strength, it is necessary to reduce the tensile residual stress caused in the joined portion, or to cause the compressive residual stress.

As a means to realize this, the applicant came up with an idea of using the martensitic transformation in which the volume expands, and has developed the above-described joining method. According to this joining method, the martensitic transformation is caused in the vicinity of the joined interface and the joined portion by the rapid heating of the joined portion of the plate member and the shaft member due to the conduction and the rapid cooling by the water-cooled electrode.

In this way, the compressive residual stress being caused in the joined portion, which is an inside of the steel material part, instead of a surface of the steel material, is the characteristic of this joining method. The fatigue strength of the joined part by the plate member and the shaft member becomes high due to this compressive residual stress.

When the martensitic transformation is caused to the steel material, this portion expands. Therefore, this causes a function to negate the tensile residual stress of the joined portion due to contraction caused by localized high heating of the joining. From the above test, the effect of the carbon equivalent of the carbon steel material was confirmed, which causes the martensitic transformation that causes the compressive residual stress to the joined portion.

Further, it was confirmed that, even in a case of joining the materials having different carbon equivalents, the compressive residual stress is similarly caused to the joined portion when one of the materials is a material that causes the martensitic transformation. It was also confirmed that the compressive residual stress is similarly caused when a material is used, such as a carburization quenched material and a material to which surface modification treatment is applied to cause the compressive residual stress and to cause a hardened layer on a surface of the material such as a soft-nitriding process described below.

Next, a confirmation test (in-house test) of fatigue strength of joined parts using the joining method according to the embodiment will be described.

Here, as the joining conditions, the plate member 20 having the plate thickness of 3.2 mm×the width of 25 mm×the length of 100 mm, and the shaft member 24 having the outer diameter of 12 mm×the length of 50 mm were used. Also, the press-fit interference was 0.3 mm (the inner diameter of the opening portion 22 of the plate member 20 was 11.7 mm).

As a fatigue test, a test mode was a pulsating torsion test, a test condition was that ⅓ of a torsional breakdown torque was loaded and whether a breakdown occurs was determined in a continuous test of up to ten million times. As test speed, a pulsating torque of 12 times/second was loaded.

The materials (steel materials) of the joined parts (joining of the plate member and the shaft member) are as follows.

A steel material having the carbon equivalent of 0.06% was used for the plate member, and a steel material having the carbon equivalent of 0.35% was used for the shaft member, as a first joined part (these carbon equivalents are the same as the above-described second material).

A steel material having the carbon equivalent of 0.06% was used for the plate member, and a steel material of the carburized material was used for the shaft member, as a second joined part (this carbon equivalent and the like are the same as the above-described third materials).

A steel material having the carbon equivalent of 0.06% was used for the plate member, and a steel material of a soft-nitrided material was used for the shaft member, as a third joined part.

Further, for comparison, MIG welding (arc welding) was performed, and as a welded part, the same material as the above-described first joined part was used.

Results of this test are as follows. Note that the test was performed with the same torque value.

In the first joined part, no fracture occurred at the ten millionth time.

Further, to confirm the fatigue strength, the above test piece was turned around, and a pulsating torsion test was additionally performed from the opposite side, the fracture occurred at the 6.27 millionth time. Further, the joined portion was not the occurrence point of the crack, and the crack simultaneously occurred in the plate member and in the shaft member.

In the second joined part, no fracture occurred at the ten millionth time.

In the third joined part, no fracture occurred at the ten millionth time.

The welded part by the MIG welding was fractured from the welded portion at the 3.31 millionth time.

From these test results, according to the joining method of the embodiment, the high fatigue strength was confirmed. This was also proved from the comparison with the fatigue strength of the above-described typical MIG welded product.

From these facts, it was confirmed that the joined part according to the above-described joining method has the joined portion in which the compressive residual stress occurs and therefore the fatigue strength is high.

Also, regarding the steel material of the soft-nitrided material related to the third joined part, sufficient fatigue strength was obtained as a result of the test. Therefore, it can be easily presumed that the compressive residual stress occurs in the joined part.

Figure 5:
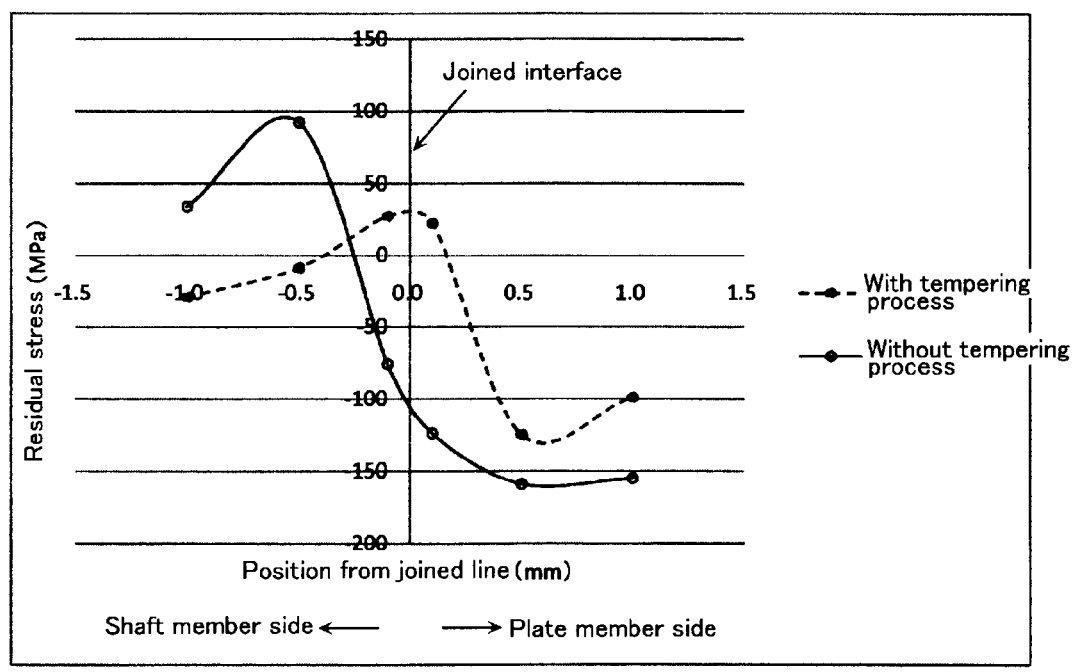
FIG. 5 is a diagram illustrating measurement results of residual stress of a joined portion in a case where the joined portion of a joined part is subjected to a tempering process and in a case where the tempering process is not performed.

Here, influence to the residual stress when a tempering process (recovery of toughness) is performed after the joining according to the joining method will be described. FIG. 5 illustrates distribution of residual stress of each joined portion in a case in which a tempering process was applied to the joined portion of a joined part after the joining, and in a case in which the tempering process was not performed. Note that, here, a steel material having the carbon equivalent of 0.06% was used for the plate member and a steel material having the carbon equivalent of 0.20% was used for the shaft member, which constitute the joined part.

As illustrated in FIG. 5, in the case where the tempering process was performed after the joining, the compressive residual stress was slightly lowered compared with the case where the tempering process was not performed, and occurrence of tensile stress was observed in some part, but this tensile stress was small and the compressive residual stress was still remained. Therefore, the fact that the high fatigue strength can be obtained is still remained.

In this way, according to the joining method, in the case where the tempering process was performed, the compressive residual stress was still remained in the joined portion, and such a characteristic is completely different from that of typical fused joining (tensile stress occurs in a wide range), and this is the characteristic of the joining method.

The above-described joining method can be used for manufacturing element parts of an automobile, a motorcycle, industrial machinery, and the like, and is, for example, suitable for manufacturing a control lever component of a transmission, a shift lever component, parts having a configuration that a shaft member is joined to a plate member, parts of an engine, and the like.

Therefore, according to the joining method of the first embodiment, since the compressive residual stress occurs in the joined portion of the plate member and the shaft member, a joined part having high fatigue strength can be obtained. In addition, since the joined part has the highly reliable joined portion and can be expeditiously and efficiently obtained, effect of excellent economical efficiency can also be obtained.

Next, a joining method according to a second embodiment will be described.

Figure 6:
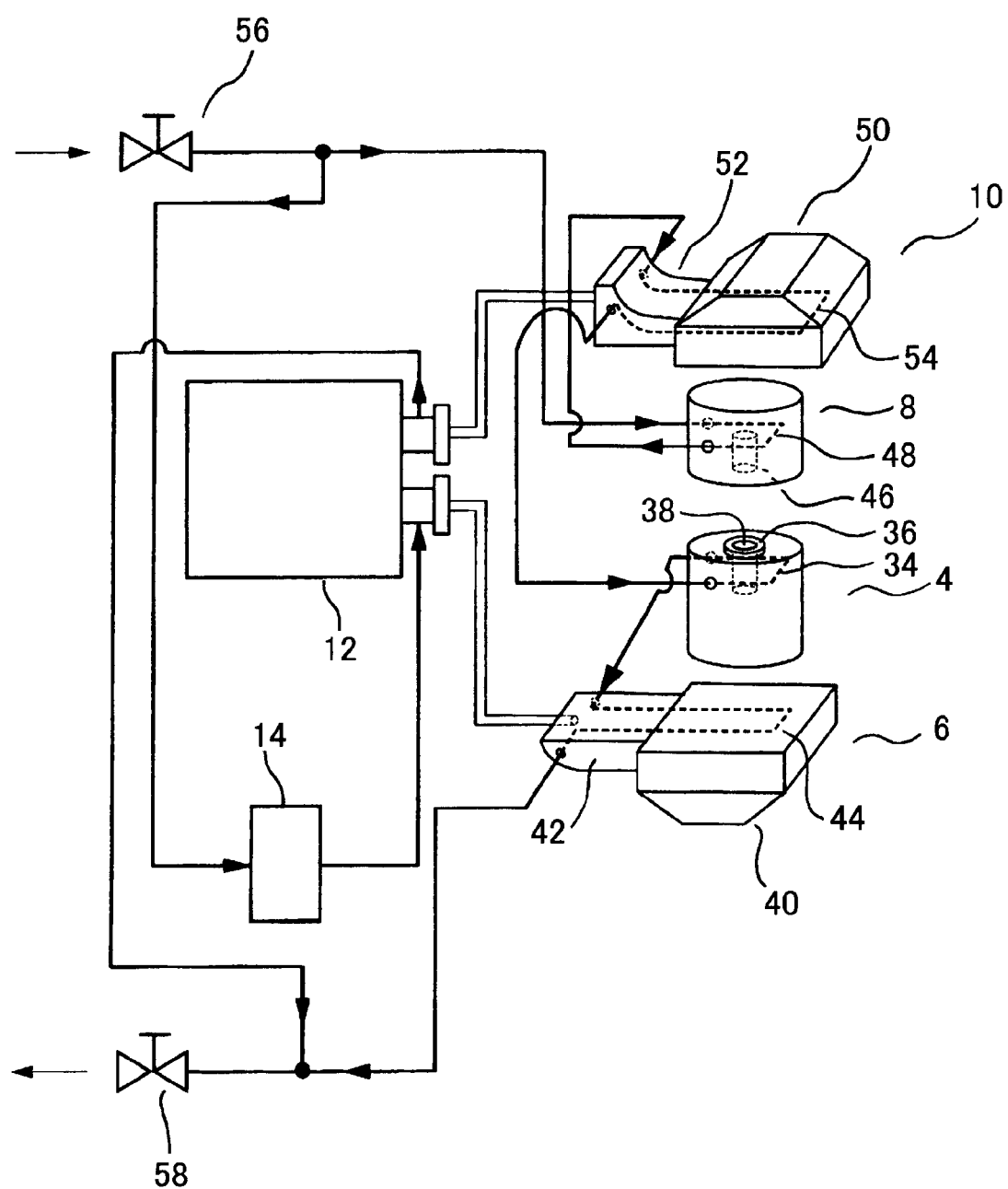
FIG. 6 is a cooling system diagram of an electrode mechanism in a joining device according to a second embodiment.

FIG. 6 illustrates a cooling system diagram of an electrode mechanism of a joining device for performing a method of joining a part having high fatigue strength according to an embodiment.

Here, jigs, members, and the like related to this embodiment that are equivalent to those of the first embodiment will be provided with the same reference signs and detailed description will not be repeated.

This electrode mechanism includes a supporting electrode 4, a lower platen 6 that holds the supporting electrode 4, a pressure electrode 8, an upper platen 10 that holds the pressure electrode 8, a power transformer 12 (TR) for power supply, a thyristor 14 (SCR) that controls cut off of the power supply to an electrode, and the like. Further, the joining device includes a positioning mechanism, a pressure mechanism (not illustrated), and the like.

A part to be joined by the joining device is formed of an element part made of metal, and includes a plate member 20 provided with an opening portion 22 and a shaft member 24 joined to the opening portion 22 of the plate member.

Both of the supporting electrode 4 and the pressure electrode 8 are made of chromium copper, and both of the lower platen 6 and the upper platen 10 are made of brass.

Figure 7:
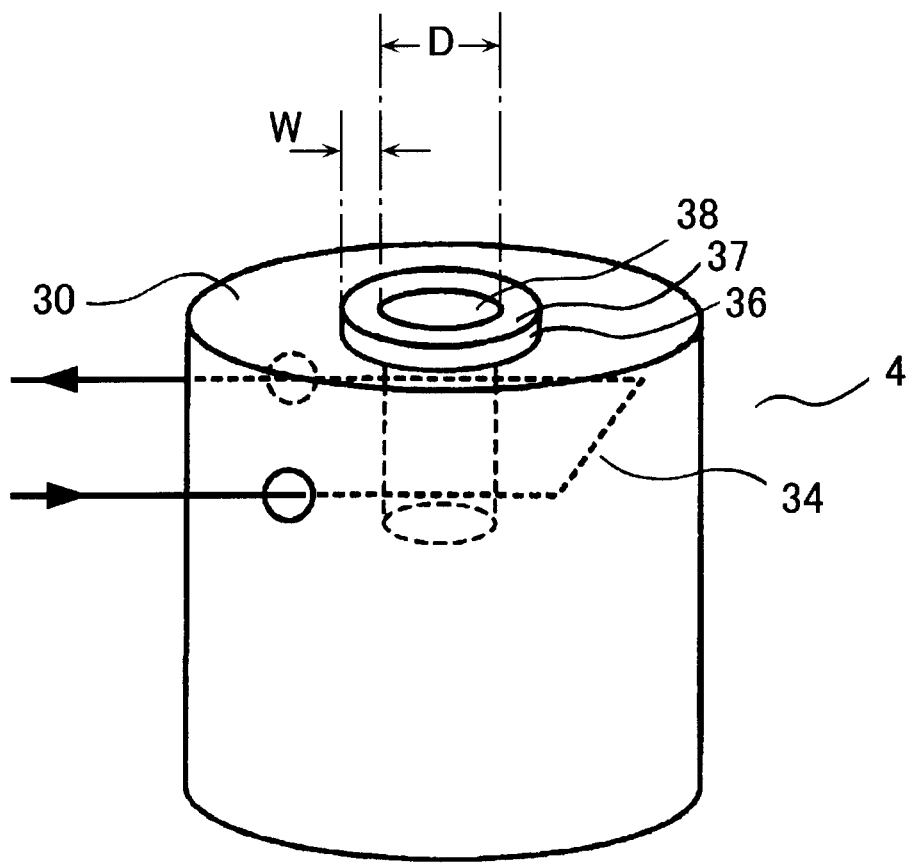
FIG. 7 is a diagram illustrating a supporting electrode according to the second embodiment.

As illustrated in FIG. 7, the supporting electrode 4 entirely has a columnar shape, and a heat radiation electrode portion 36 (a hole portion 38 in a center) is formed on a center of an upper surface portion 30. Also, a cooling circuit 34 through which a coolant passes is formed inside the supporting electrode 4. This cooling circuit 34 is formed into a U shape in a state of surrounding the hole portion 38 when the supporting electrode 4 is viewed from above, and is horizontally formed nearer an upper position between an upper end and a lower end of the supporting electrode 4.

The heat radiation electrode portion 36 is bulged out in the form of a ring (a circle) on the center of the upper surface portion 30 of the supporting electrode 4, and the hole portion (or a through opening portion) having a circular cross section is formed in the center of the heat radiation electrode portion 36. A flat ring-shaped (circular) upper surface contact portion 37 is formed in an upper surface of the heat radiation electrode portion 36. Also, the hole portion 38 is extended downward with the same inner diameter.

The hole portion 38 is provided to form a relief because a periphery of the opening portion 22 of the plate member 20 is deformed in a press-fit direction when the shaft member 24 is press-fit joined to the plate member 20 (the opening portion 22) as a work piece.

Figure 8:
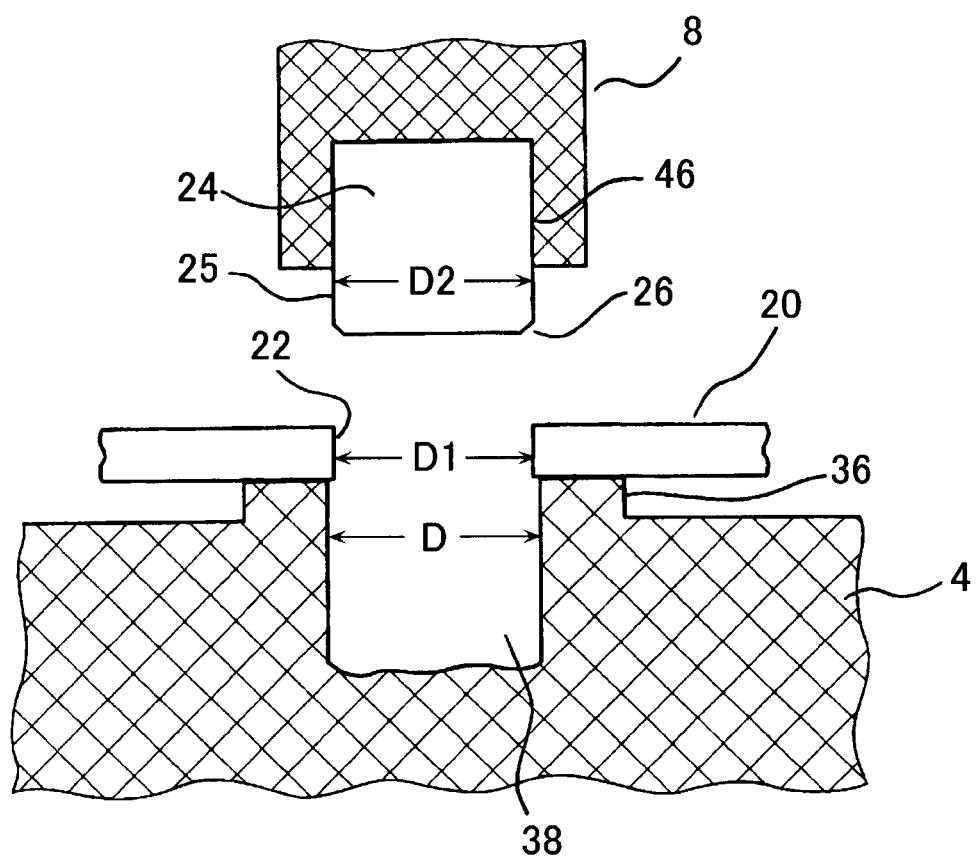
FIG. 8 is a diagram illustrating a state in which a work piece is held by an electrode according to the second embodiment.

As illustrated in FIG. 8, the size of the hole of the hole portion 38 (D: diameter) is formed slightly larger than that of the shaft member 24. This is because the shaft member 24 is kept from coming in contact with the hole portion 38 of the supporting electrode 4.

The lower platen 6 includes a holding unit 40 that places and holds the supporting electrode 4 on an upper surface portion, and a conduction unit 42 extended from the holding unit 40. Further, a cooling circuit 44 through which a coolant passes is formed inside the lower platen 6.

The pressure electrode 8 has a columnar shape, and a circular holding hole portion 46 is formed with a predetermined depth in a center of a lower surface portion. Also, a cooling circuit 48 through which a coolant passes is formed inside the pressure electrode 8. The holding hole portion 46 of the pressure electrode 8 holds the shaft member 24 as a work piece.

The upper platen 10 includes a pressure holding unit 50 that attaches the pressure electrode 8 to a lower surface portion, and a conduction unit 52 extended from the pressure holding unit 50. A cooling circuit 54 through which a coolant passes is formed inside the upper platen 10. Also, an upper surface portion of the pressure holding unit 50 is fixed to an actuator unit of a press mechanism, which is a hydraulic type and the like, of the joining device, and the pressure holding unit 50 descends with a given pressure force.

The cooling circuits are coupled in series, and a coolant passing through a water supply valve 56 from a water supply apparatus sequentially passes and cools the cooling circuit 48 of the pressure electrode 8, the cooling circuit 54 of the upper platen 10, the cooling circuit 34 of the supporting electrode 4, and the cooling circuit 44 of the lower platen 6, and passes through a drain valve 58 and is drained.

The power supply used for the conduction can employ a direct current and the like that use a direct-current, an alternating-current, or a high-capacity capacitor. Also, adjustment of the pressure force, starting/stopping control of conduction (by the thyristor 14) with respect to the supporting electrode 4 and the pressure electrode 8 from the power transformer 12, and adjustment of a flow rate of the coolant of the cooling circuit and opening/closing control of the cooling circuit can be performed according to control from a control unit (not illustrated).

The plate member 20 has a predetermined thickness, and the opening portion 22 provided in the plate member 20 has a circular shape with a cross section having a constant diameter, and an inner wall surface portion of the opening portion 22 is formed from a plate surface of the plate member 20 in a vertical direction.

Here, the plate thickness of the plate member 20 is 3.2 mm, and the inner diameter of the opening portion 22 is 11.7 mm. It is appropriate that the plate thickness of the plate member 20 is 1 mm or more, and the upper limit of the plate thickness depends on the inner diameter of the opening portion (the diameter of the shaft member 24) and the like.

The shaft member 24 has a columnar shape with a constant cross section, and has a flat upper surface portion and lower surface portion. Also, a corner portion of a periphery of the lower surface portion of the shaft member 24 is removed, and a chamfered portion 26 is formed.

Here, the shaft member 24 has the outer diameter of 12.0 mm. It is appropriate that the outer diameter of the shaft member 24 is equivalent to or more than double the plate thickness of the plate member 20. Also, the upper limit of the outer diameter of the shaft member 24 depends on the capacity of the power transformer 12 and the like.

Also, as a material for both of the plate member 20 and the shaft member 24, a steel material having the carbon equivalent of 0.06% was used. Note that the steel material having the carbon equivalent of 0.06% rarely causes the martensitic structure.

The outer diameter of an insertion portion 25 of the shaft member 24 is slightly larger than the inner diameter of the opening portion 22 of the plate member 20, and a press-fit interference is a difference therebetween. This press-fit interference allows an outer periphery portion of the insertion portion 25 of the shaft member 24 to contact with and to rub on an inner wall surface portion of the opening portion 22 of the plate member 20 to form a joined interface, so that press-fit joining throughout the complete periphery is performed.

Further, one of or both of an upper edge portion of the opening portion of the plate member 20 and an edge portion of the lower surface portion of the shaft member 24 are subjected to a chamfering process. Further, as a work piece of a member having an opening portion drilled into a predetermined shape (various shapes such as a cube), a shaft member having a cross section that has a similar figure (or not a similar figure) to the above-described opening portion can be used.

As conditions of press fit, a predetermined press-fit interference (d) and a press-fit depth (h) are set. This press-fit interference (d) is regarding the diameter, and here, d=the outer diameter (D2) of the shaft member 24—the inner diameter (D1) of the opening portion 22 of the plate member 20. Also, the press-fit depth (h) is h=a press-fit depth of the shaft member 24.

In this embodiment, the press-fit interference (d) is 0.3 mm (12.0-11.7 mm). The press-fit interference can be in any range as long as press fit is possible. The press-fit interference of the range of 0.1 to 1.0 mm is practical, and the range of 0.1 mm to 0.5 mmm is satisfactory since fewer burrs occur.

Other than the above, the range of the press-fit depth, the range of the inner diameter of the opening portion 22, other configuration of the plate member 20 and the shaft member 24 as a work piece are similar to those explained in the first embodiment.

Further, this embodiment employs a configuration of intensively cooling a joined portion 23 of the plate member 20 and the shaft member 24 as a work piece using the supporting electrode 4. This uses a characteristic of good electrical conductivity and thermal conductivity of the supporting electrode 4 and the pressure electrode 8.

The cooling of the joined portion 23 is intended to reduce the tensile residual stress to the extent that does not cause a problem, and to add the compressive residual stress by actively cooling the joined portion 23 so as to make the temperature gradient small caused between the joined portion 23 that is a portion having the highest temperature and a portion that is subjected to the influence of the heat.

To actively cool the joined portion 23 in this way, here, the periphery of the opening portion 22 of the plate member 20 is caused to be in contact with only the vicinity of the joined portion of the electrode using the heat radiation electrode portion 36, and other portion is not allowed to be in contact or is covered with a dielectric thermal insulating material.

Also, the contact width (W) (the width of a ring member) of the upper surface contact portion 37 in the heat radiation electrode portion 36 of the supporting electrode 4 favorably satisfies the following condition.

As illustrated in FIG. 7, it is necessary to have the contact width with which the electrode is not deformed by the pressure force, and to properly narrow the contact width so that only the joined portion 23 is actively cooled. The applicant decided, as a result of experimentally pursuing an effective size of the contact width, that the minimum contact width (W) is 3 mm, and the maximum contact width is five times or less the press-fit depth (usually, the same as the plate thickness of the plate member 20).

The reason why the minimum contact width is 3 mm is to secure the strength as the electrode, and the reason why the maximum contact width is five times or less the joining thickness is that, when the joining method according to this embodiment is employed, the maximum electrical resistance portion is the joined portion, and if the contact width is not caused to be larger than this portion, heat generation due to the resistance heat is caused in this contact portion.

In this embodiment, this contact width (W) is 10 mm.

Here, a process related to the above-described joining method will be described.

In a joining process, joining conditions are set in advance for a joining device (control unit). The joining conditions include a pressure force, a pressure time, a current value, a conduction time, a conduction pattern of electricity, and the like.

In this embodiment, the pressure force is 4000 N.

Also, the conduction current is 17 kA, and the conduction time is 0.25 seconds. An optimal value of the conduction time is determined according to the joining conditions and the like. The conduction time is set to be one second or less, and a range of 0.1 to 0.5 seconds is most suitable for this.

Further, with the start of the joining process, the water supply valve 56 and the drain valve 58 are opened based on an instruction from the control unit, and supply of a coolant to be sent to each cooling circuit from the water supply apparatus is started. The pressure electrode 8, the upper platen 10, the supporting electrode 4, and the lower platen 6 are cooled by the coolant distributed in each cooling circuit.

Then, as illustrated in FIG. 8, as a work clamp process, the electrodes hold the plate member 20 and the shaft member 24, respectively. The plate member 20 is placed on the upper surface contact portion 37 of the ring-shaped heat radiation electrode portion 36 of the supporting electrode 4. At this time, the plate member 20 is positioned and arranged in such a way that a center of the opening portion 22 of the plate member 20 is located on a center of the hole portion 38 of the heat radiation electrode portion 36. At this time, a positioning member and the like may be used to allow the plate member 20 to be fit in a predetermined position.

Accordingly, the center of the opening portion 22 of the plate member 20 is adjusted to the center of the heat radiation electrode portion 36 of the supporting electrode 4, and the opening portion 22 of the plate member 20 and the hole portion 38 of the heat radiation electrode portion 36 becomes overlapped with each other, so that a periphery portion of the opening portion 22 of the plate member 20 comes in contact with the upper surface contact portion 37 of the supporting electrode 4.

Also, the pressure electrode 8 holds the shaft member 24. This shaft member 24 is inserted into the holding hole portion 46 of the pressure electrode 8, and is physically grasped and held by the holding hole portion 46. In this way, the shaft member 24 is grasped by the holding hole portion 46, whereby an influence of electrical resistance of the shaft member 24 itself can be reduced.

Next, the process moves on to a pressuring process by a press mechanism. The pressure force by the press mechanism is always held constant. With the press mechanism, the shaft member 24 is moved to a predetermined positioning position by the upper platen 10 while being held by the pressure electrode 8. Then, the press mechanism presses the upper platen 10 to cause the shaft member 24 to descend with the pressure force, so that the shaft member 24 is shortly engaged with the opening portion 22 of the plate member 20.

In this way, the shaft member 24 is engaged with an upper portion of the opening portion 22 of the plate member 20, and the both sides are adjusted with a time lag of about one second. Accordingly, the shaft member 24 and the opening portion 22 of the plate member 20 are accurately adjusted by the chamfered portion of the shaft member 24.

Also, the shaft member 24 is maintained with a given pressure force with respect to the opening portion 22 of the plate member 20 by the press mechanism.

Figure 9:
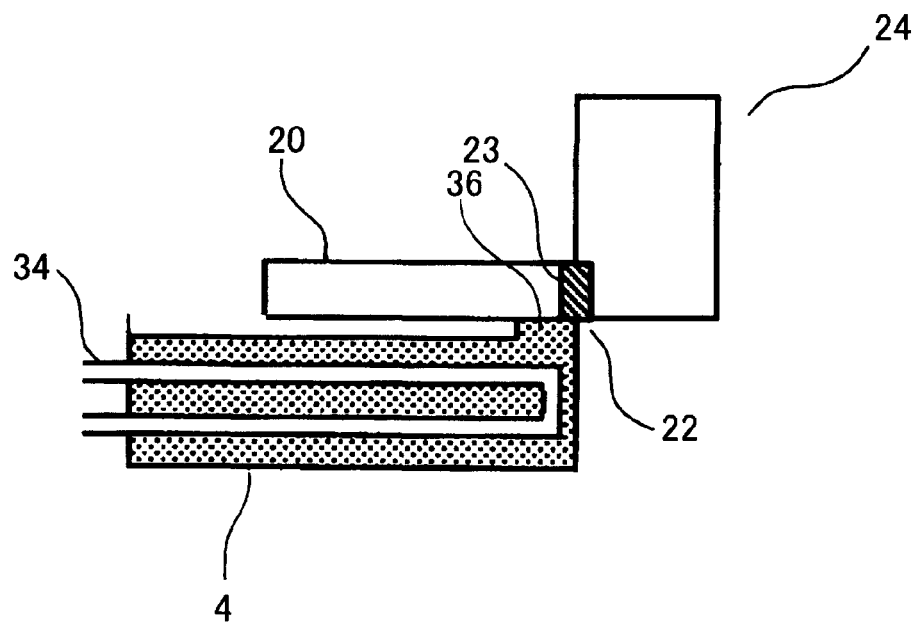
FIG. 9 is a diagram illustrating a joined state according to the second embodiment.

Then, the conduction between the pressure electrode 8 and the supporting electrode 4 is started according to an instruction from the control unit. Accordingly, as illustrated in FIG. 9, a large amount of electric current in a joined portion 23 of the shaft member 24 and the opening portion 22 of the plate member 20, the joined portion 23 is softened as occurrence of electrical resistance heat generation and press fit of the shaft member 24 is started, and the insertion portion 25 of the shaft member 24 descends in the opening portion 22 of the plate member 20.

In this case, the shaft member 24 is press fit into the opening portion 22 of the plate member 20, and at this time, a rubbing action is caused to the joined interface of the both members, whereby the press-fit joining is performed. This rubbing smoothes an impurity layer of surfaces and the surfaces are cleaned, and the solid-phase diffusion joining is performed with respect to this cleaned structure.

In the above-described joining method, the press-fit is performed with a given pressure force as described above, and the joined portion is instantly heated and a tip portion of the shaft member 24 is press fit into the opening portion 22 of the plate member 20 in a short time, so that the joining is completed.

After a predetermined time elapses from the start of the conduction, the conduction is stopped according to an instruction from the control unit. The conduction time from the start to the stop of the conduction is set slightly longer than the time from the start to the completion of the press-fit joining of the shaft member with respect to the hole portion of the plate member. Here, the conduction time is 0.25 seconds.

Also, in this case, because of a sharp decrease in electrical resistance heat generation due to the progress of press fit, a softening phenomenon of the joined portion 23 stops simultaneously, and the progress of press fit stops. Following that, the conduction between the pressure electrode 8 and the supporting electrode 4 is stopped.

Right after the press fit, the temperature of the joined portion 23 of the opening portion 22 of the plate member 20 and the shaft member 24 as a work piece is high.

Meanwhile, the supporting electrode 4 is always cooled by the cooling circuit 34. Therefore, the heat radiation electrode portion 36 on which the plate member 20 is placed is also cooled, and the joined portion 23 of the plate member 20 and the shaft member 24 that contacts with the upper surface contact portion 37 of the heat radiation electrode portion 36 is intensively cooled.

Also, in conjunction with that, cooling of the joined portion 23 is performed by the cooled pressure electrode 8 via the shaft member 24. Further, the supporting electrode 4 is cooled by the cooled lower platen 6, and the pressure electrode 8 is also cooled by the upper platen 110, whereby effective cooling is performed.

As a result, the temperature distribution in the vicinity of the joined portion 23 is lower than that of a periphery portion. Also, the hardness of the base material of the joined portion is recovered and is strongly joined due to the cooling of the joined portion 23.

Here, the applicant conducted a joining method according to an another embodiment using a supporting electrode having a flat surface similar to the first embodiment (not provided with the heat radiation electrode portion 36) other than the joining method according to the second embodiment. These embodiments are conducted according to internal tests.

The joining method according to the second embodiment uses the embodiment illustrated in FIG. 9, and the joining method according to the another embodiment uses the embodiment illustrated in FIG. 3.

In the joining method according to the another embodiment, an electrode, upper and lower platens, a pressure electrode, a cooling circuit, a plate member 20, a shaft member 24, a shape of a work piece, a joining condition, and the like are the same except that a configuration of a supporting electrode 4 is different.

Figure 10:
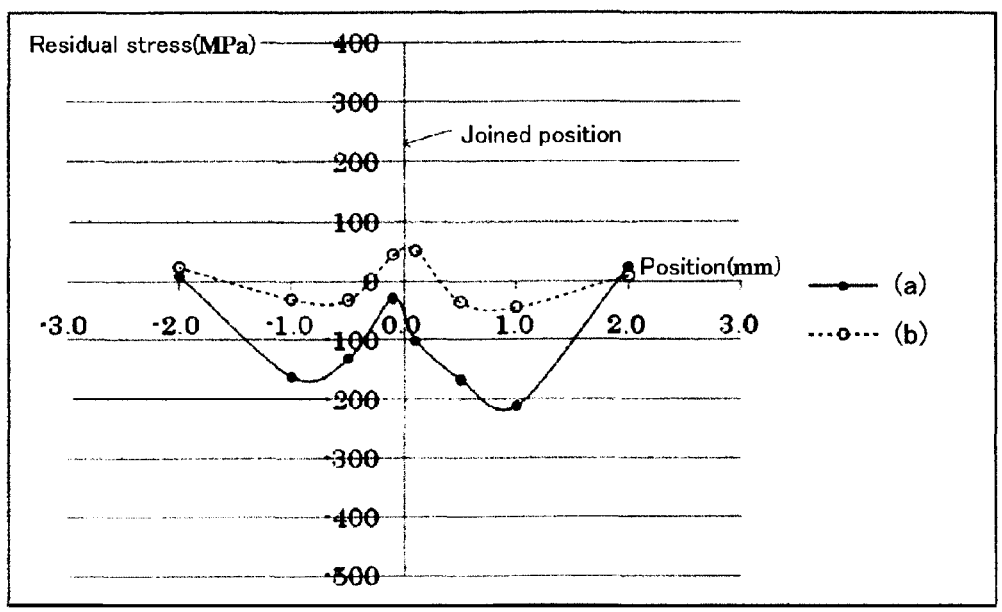
FIG. 10 is a diagram illustrating measurement results of residual stress of a joined portion according to the second embodiment (a micro-area X-ray stress measurement apparatus manufactured by Rigaku Corporation is used for measurement).
Figure 11:
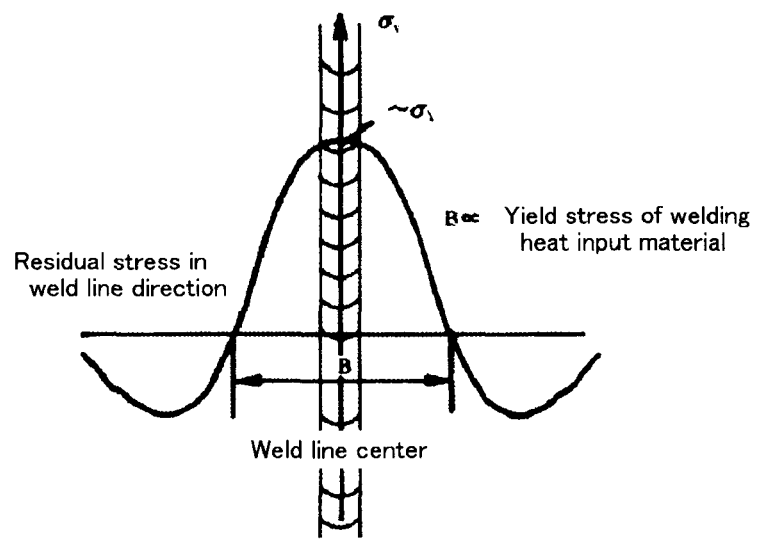
FIG. 11 is a residual stress distribution diagram of a typical fused joined portion (controlling factors of magnitude of residual stress in a weld-line direction and an extent of tensile residual stress).

FIG. 10 relates to the joined parts (the shaft member is joined to the plate member) using each of the joining methods, and illustrates results of measuring residual stress of the joined portions 23. In the drawing, the solid line (a) illustrates a result of the joining method according to the second embodiment, and the dotted line (b) illustrates a result of the joining method according to the another embodiment.

FIG. 10 relates to residual stress distribution of the joined portions, the horizontal axis represents a joined position (mm), "0.0" shows a center position of the joining, a right side of "0.0" shows a shaft member 24 side, and a left side shows a plate member 20 side. Also, the vertical axis represents residual stress (MPa), and a plus side of the center position "0" shows occurrence of the residual stress of tensile (tensile residual stress) and a minus side shows occurrence of the residual stress of compression (compressive residual stress), respectively.

According to a measurement result, in the joining method (a) of the second embodiment, the residual stress occurring in the joined portion 23 (the position in the horizontal axis is in the vicinity of 0) is distributed at the compressive residual stress side (at the minus side).

As the joining method according to the second embodiment, when the compressive residual stress occurs in the joined portion, there is an excellent characteristic of high fatigue strength.

Meanwhile, in the joining method according to the another embodiment, the residual stress occurring in a part of the joined portion 23 (plus 0.5 mm and minus 0.5 mm from the position "0") is distributed at the tensile residual stress side (at the plus side).

From this result (under the same joining condition using the same work piece), it was confirmed that the compressive residual stress occurs as the effect of intensive cooling of the joined portion 23 as a work piece by the heat radiation electrode portion 36 of the supporting electrode 4 according to the second embodiment.

Therefore, it was confirmed that, even in a case where the steel material having the carbon equivalent of 0.06% that rarely causes the martensitic structure is used for the plate member 20 and the shaft member 24 as a work piece, the intensive cooling of the joined portion 23 results in special effect of occurring the compressive residual stress. Also, it is needless to say that a similar result can be obtained with a material that generates the martensitic structure.

To prevent occurrence of the tensile residual stress and to create a joined part having high fatigue strength, it is necessary to minimize the tensile residual stress caused in the joined portion, or to cause the compressive residual stress.

To realize this, it is necessary to minimize the tensile residual stress, or to cause the compressive residual stress by a method of cooling a welded portion and a base material portion while maintaining the temperature of the both portions, or by a method of rapidly cooling the welded portion to a normal temperature.

The applicant experimentally confirmed that the application of this joining method as a method of generating the compressive residual stress is effective. Also, especially, intensive cooling of the joined portion of the work piece results in special effect of generating the residual compressive stress.

Further, the compressive residual stress occurring inside the steel material, which is a joined interface, rather than occurring on the surface of the steel material, is the characteristic of this joining method. The fatigue strength of the joined part by the plate member and the shaft member becomes high due to the compressive residual stress.

Note that, according to the joining method using the supporting electrode according to the second embodiment using the first to third materials of the first embodiment, it can be easily presumed that a joined part having high compressive residual stress and high fatigue strength can be obtained.

This joining method can be used for manufacturing element parts of an automobile, a motorcycle, industrial machinery, and the like, and is suitable for manufacturing parts having a configuration that a shaft member is joined to a plate member, parts of an engine, and the like.

Therefore, according to the second embodiment, since the compressive residual stress occurs in a joined portion of a plate member and a shaft member, a joined part having high fatigue strength can be obtained, and in addition, a joined part has a highly reliable joined portion, and can be expeditiously and efficiently obtained. Therefore, effect of excellent economical efficiency can also be obtained.

Note that, even in this embodiment, it is effective to perform a tempering process after the joining in order to recover toughness of the joined portion as described in the first embodiment.

REFERENCE SIGNS LIST

4 Supporting electrode
8 Pressure electrode
20 First member (plate member)
22 Opening portion
23 Joined portion
24 Second member (shaft member)
34 Cooling circuit
36 Heat radiation electrode portion
37 Upper surface contact portion

The invention claimed is:

1. A method of manufacturing a part having high fatigue strength by joining a first member having an opening portion formed in a vertical direction and a second member having an insertion portion with a constant cross section, the method comprising:
providing a press-fit interference to the insertion portion of the second member corresponding to the opening portion of the first member;
using a supporting electrode having a cooling circuit formed inside, and a pressure electrode movably arranged above the supporting electrode;
using a steel material causing martensitic transformation for one of or both of the first member and the second member;
supplying a coolant to the cooling circuit; placing the first member on an upper surface portion of the supporting electrode and causing the pressure electrode to hold the second member;
causing the pressure electrode to descend with a pressure force and engaging the second member with the opening portion of the first member;
starting conduction from a power supply to the supporting electrode and the pressure electrode, rapidly heating a joined portion between the both members by resistance heat due to the conduction and softening the joined portion, causing the insertion portion of the second member to enter the opening portion of the first member by the pressure force of the pressure electrode, and causing the second member and an inner wall surface portion of the opening portion to be subjected to solid-phase diffusion joining;
rapidly cooling the both members by thermal conduction of the supporting electrode after completion of the joining; and
quenching the joined portion and generating compressive residual stress by the rapid cooling.

2. The method of manufacturing a part having high fatigue strength according to claim 1, wherein a steel material having a carbon equivalent of 0.15% or more is used for one of or both of the first member and the second member.

3. The method of manufacturing a part having high fatigue strength according to claim 1, wherein a steel material subjected to a carburization process or a steel material subjected to a soft-nitriding process is used for one of or both of the first member and the second member.

4. A method of manufacturing a part having high fatigue strength by joining a first member having an opening portion formed in a vertical direction and a second member having an insertion portion with a constant cross section, the method comprising:
providing a press-fit interference to the insertion portion of the second member corresponding to the opening portion of the first member;
using a supporting electrode having a cooling circuit formed inside, and a pressure electrode movably arranged above the supporting electrode;
using a steel material for both of the first member and the second member;
supplying a coolant to the cooling circuit;
adjusting the opening portion of the first member with a hole portion of a heat radiation electrode portion bulged out in a form of a ring on a part of an upper surface portion of the supporting electrode and placing the first member on an upper surface contact portion of the heat radiation electrode portion, and causing the pressure electrode to hold the second member;
causing the pressure electrode to descend with a pressure force and engaging the second member with the opening portion of the first member;
starting conduction from a power supply to the supporting electrode and the pressure electrode, rapidly heating a joined portion between the both members by resistance heat due to the conduction and softening the joined portion, causing the insertion portion of the second member to enter the opening portion of the first member by the pressure force of the pressure electrode, and causing the second member and an inner wall surface portion of the opening portion to be subjected to solid-phase diffusion joining;
rapidly cooling the joined portion being in contact with the heat radiation electrode portion by thermal conduction after completion of the joining; and
generating compressive residual stress to the joined portion by the rapid cooling of the joined portion.

5. The method of manufacturing a part having high fatigue strength according to claim 4, wherein a contact width of the upper surface contact portion of the heat radiation electrode portion is 3 mm or more.

6. The method of manufacturing a part having high fatigue strength according to claim 4, wherein the contact width of the upper surface contact portion is five times or less a press-fit depth of the insertion portion of the second member to enter the opening portion of the first member.

7. The method of manufacturing a part having high fatigue strength according to claim 5, wherein the contact width of the upper surface contact portion is five times or less a press-fit depth of the insertion portion of the second member to enter the opening portion of the first member.

\* \* \* \* \*